July 7, 1959 W. W. CROUSE 2,893,893

METHOD AND APPARATUS FOR ELECTROSTATIC COATING

Filed Jan. 31, 1950 4 Sheets-Sheet 1

INVENTOR.
WILLIAM W. CROUSE,

BY

ATTORNEY.

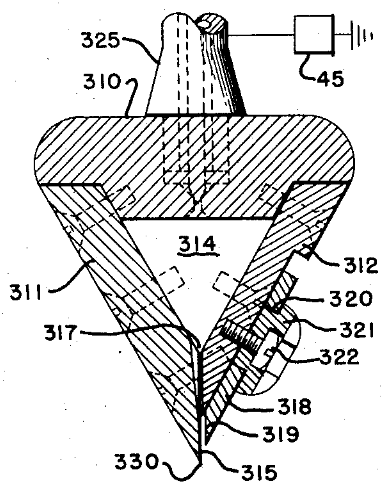
Fig. 6
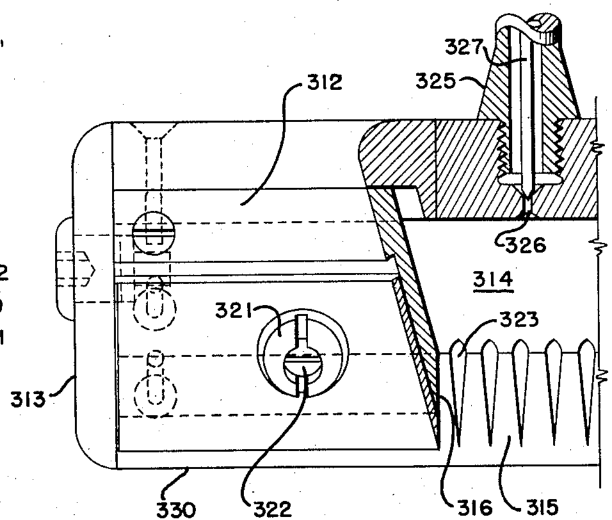
Fig. 7
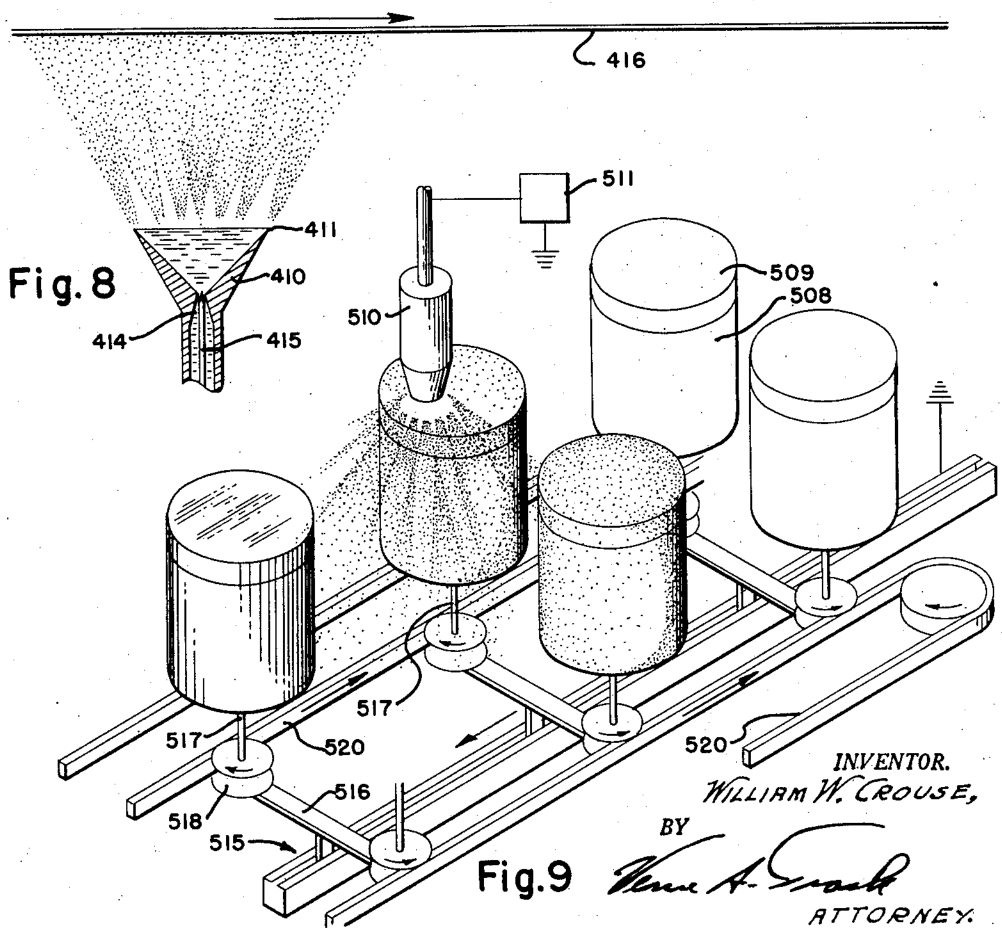
Fig. 8
Fig. 9

METHOD AND APPARATUS FOR ELECTROSTATIC COATING

Filed Jan. 31, 1950 4 Sheets-Sheet 3

INVENTOR.
WILLIAM W. CROUSE,
BY
Verne A. Trask
ATTORNEY.

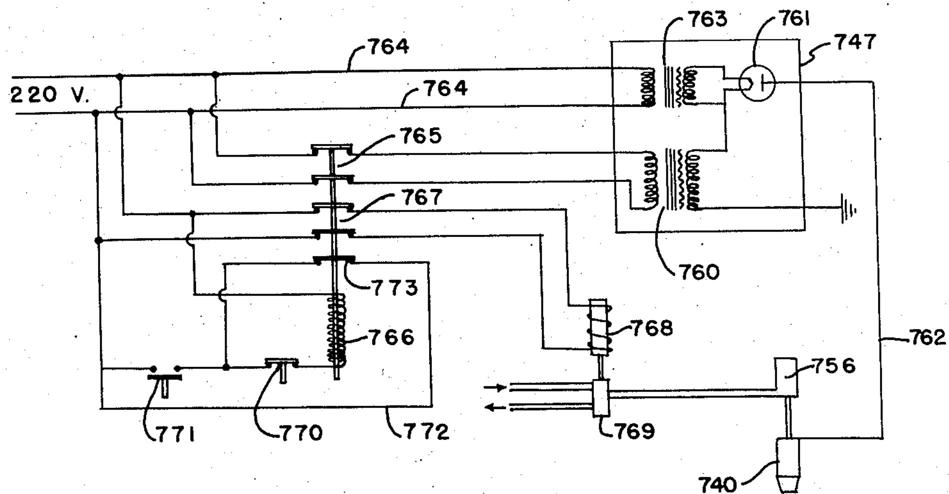
Fig. 12
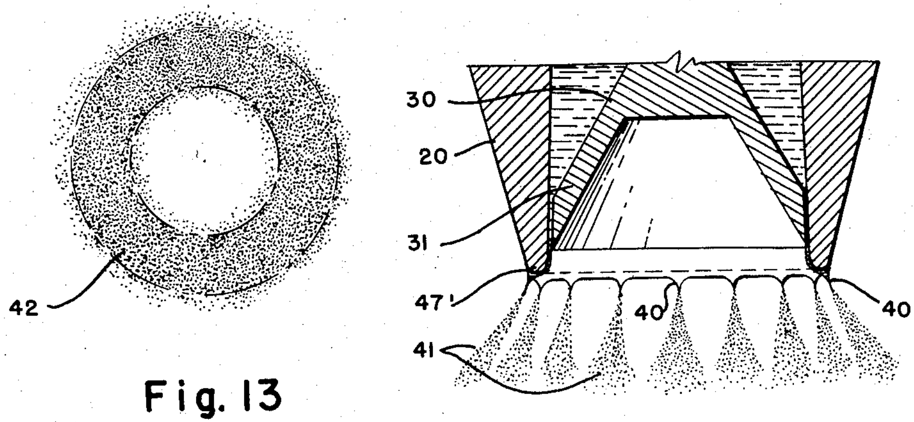
Fig. 13
Fig. 14
INVENTOR.
WILLIAM W. CROUSE,
BY
ATTORNEY.

United States Patent Office 2,893,893

Patented July 7, 1959

2,893,893

METHOD AND APPARATUS FOR ELECTROSTATIC COATING

William W. Crouse, Carmel, Ind., assignor to Ransburg Electro-Coating Corp., Indianapolis, Ind., a corporation of Indiana Application January 31, 1950, Serial No. 141,509

12 Claims. (Cl. 117—93)

This application relates to improvements in methods of and apparatus for effecting the atomization of liquids, and especially in electrostatic coating methods and apparatus adapted for use in the application of liquid coatings. The application is a continuation in part of my prior application Serial No. 13,174, filed March 5, 1948, now abandoned.

Electrostatic fields have been utilized in the art of coating for some time in the past. For example, U.S. Patent No. 2,247,963 issued July 1, 1941, to Harper J. Ransburg Co. discloses a method and apparatus in which paint or other coating material, after atomization, is sprayed in particled form into an electrostatic field by which it is deposited on articles to be coated. Patent No. 2,359,476, granted October 3, 1944, also to Harper J. Ransburg Co., discloses a method and apparatus in which an electrostatic field is employed to remove liquid coating material which appears in the form of concentrated accumulations on articles which have been dip-coated.

In the printing art, it has been proposed to employ an electrostatic field to effect, or to aid in effecting, the transfer, usually in pattern, of ink or other liquids between two surfaces which are lightly in contact with each other or which are separated by narrow gaps—gaps varying from a few thousandths to a few hundredths of an inch.

Prior application Serial No. 556,390, filed September 29, 1944, by Edwin M. Ransburg and William A. Starkey, now Patent No. 2,685,536, discloses a method and apparatus in which an electrostatic field was employed both to atomize liquid coating material and to deposit the particles formed by such atomization. According to that application, the liquid coating material was atomized at one or more points, each the site of a more or less discrete drop or small liquid body from the surface of which the electrostatic atomization took place. To replace the coating material removed from each drop or body by atomization, provision was made for replenishing it with an individual stream of coating material.

The use of a single electrostatic field to produce both electrostatic atomization and electrostatic deposition of coating materials has many advantages. The proportion of coating material which is atomized and escapes deposition on the article is greatly reduced, and as a whole the process is highly efficient; it reduces and in many cases completely eliminates the necessity for ventilation; it permits a reduction in the space required for performing coating operations; the necessary apparatus is considerably simplified; and coating can be carried on under much cleaner conditions. However, the method and apparatus specifically disclosed in the aforesaid prior application Serial No. 556,390 has a disadvantage in that it is difficult to provide satisfactory control of the individual coating-material streams which are employed to replenish the drops or small bodies from which the atomization takes place. Without such control, some of the bodies might be inadequately replenished to cause localized impoverishments in the spray pattern while others might receive liquid at too great a rate.

It is accordingly the primary object of the present invention to provide a method and apparatus by which a liquid may be atomized at a plurality of points without the necessity for structural features supporting more or less discrete bodies or drops of the liquid and without the necessity for providing and controlling in a coordinated manner a plurality of streams flowing to the respective points of atomization.

Other objects of the invention are the provision of an improved method of and apparatus for electrostatically coating articles, the promotion of the efficient use of coating material through more effective atomization, the obtaining of better control of atomized coating material, and the promotion of uniform coating thickness.

An additional object of the invention is to simplify the coating of the interior surfaces of hollow articles, or of concave surfaces generally.

Still another object of the invention is to provide electrostatic coating apparatus which is considerably simplified, efficient in use, compact, and clean in operation.

The present invention involves my discovery that in order to effect electrostatic atomization of liquids at a plurality of points it is not necessary to provide structural features for supporting more or less discrete bodies or small drops of liquid or for feeding liquid to points of atomization in independent streams. Specifically, I have discovered that if the liquid is fed as an extended, thin stream or film and if an electrostatic field of sufficient strength is maintained along the leading edge of such stream or film, the field will act to distort the film edge and form it into a series of cusps, the bases of which will be continuous with the film or stream of liquid. The electrostatic atomization takes place from the tip of each cusp, the atomized material forming a divergent spray of discrete particles which carry electrical charges and which are electrostatically projected away from the film. The pattern of the spray formed by the aggregate of the jets originating at the tips of the cusps may be controlled to a large extent by controlling the cross-sectional shape of the liquid film or stream at the edge of which the cusps form. If the liquid film or stream is plane, the cusps will lie in a straight line and the spray will be generally prismatic in form. If the film is annular, the cusps will lie on a circle and the spray will have a hollow, frusto-conical form. If the field-strength along the film-edge is uniform, the cusps formed along the edge of the film tend to space themselves at equal intervals, probably due to forces of mutual electrical repulsion; and if the film is an annular film, the cusps will be uniformly distributed around its annular edge.

In practicing the invention, I employ an atomizer having a discharge member having an extended surface adapted to define one face of the film of liquid from the edge of which atomization is to take place, such discharge-member surface desirably having its terminal portion exposed so that the film on such terminal portion will be free-surfaced and will tend to distribute itself uniformly as it flows toward the edge where atomization occurs. Associated with the discharge member I provide means for feeding the liquid to the film-defining surface. The shape of the discharge member, and more particularly the shape of its film-defining surface, in a plane transverse to the direction of film-flow determines the cross-sectional shape of the film and the shape of the film-edge along which atomization occurs. The discharge member may be formed to provide an annular film and a circular discharge edge, a plane film and a straight discharge edge, or may be otherwise formed.

In electrostatic coating, the process of the invention may be carried out by presenting in a predetermined position the leading edge of an extended, thin stream of liquid coating material and moving an article past such leading edge and in spaced relation thereto while an electrostatic field is maintained between such edge and the article. In quantity production, a plurality of articles may be mounted on a conveyor so as to be brought successively into opposed relation with the film-edge. The film will be formed and supported by an atomizer, as above set forth; and the discharge member of the atomizer will of course be disposed so that the leading edge of the liquid film is presented generally toward the article-path, and will be so constructed and disposed as to avoid electrical shielding of the film-edge from which atomization takes place.

Control of the supply of liquid material to and distribution of liquid along the film-defining surface of the discharge member may be obtained in any convenient manner, as by associating with the discharge member a control or regulating member spaced from the film-defining surface of the discharge member to provide an extended orifice through which the liquid flows to form the aforesaid film.

In the drawings:

Fig. 6 is a transverse section of still another form of atomizer;

Fig. 7 is a partial side view, partially in section, of the atomizer shown in Fig. 6;

Fig. 8 is a side view in section of yet another form of atomizer as it may be used for coating;

Fig. 9 is an isometric view of coating apparatus which incorporates the atomizer shown in Figs. 1 and 2;

Fig. 12 is a wiring diagram illustrative of the operating electrical circuits for the apparatus shown in Fig. 11;

Fig. 13 shows in a general form a pattern which is obtained by the atomizer shown in Fig. 1; and Fig. 14 is a fragmental view similar to Fig. 1 illustrating the manner in which atomization occurs.

Figure 1:
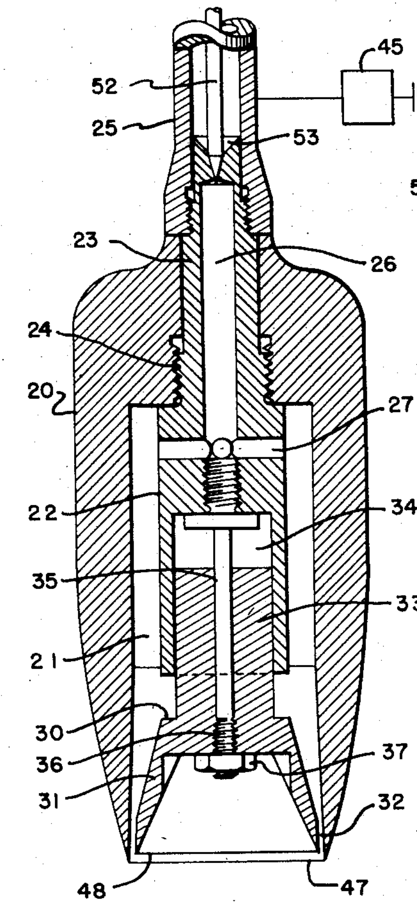
Fig. 1 is an axial section of one form of atomizer embodying the invention.
Figure 2:
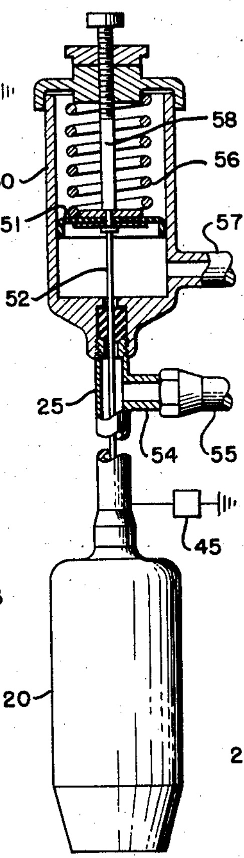
Fig. 2 is a side elevation of the atomizer shown in Fig. 1 in association with the liquid source and its controls.

The atomizer shown in Figs. 1 and 2 is designed to produce an annular spray pattern. It comprises a body 20 of circular cross-section disposed with its axis vertical and provided at its lower end with an axial recess 21 also of circular cross-section. The lower portion of the body 20 serves as the discharge member and the wall of the recess 21 constitutes the surface that shapes and supports an annular film of liquid from the lower edge of which atomization is to occur. To adapt the body member 20 for connection to a source of liquid, I may employ a stem 22 having a shank 23 of reduced diameter which is screw-threadedly received in the body member 20 as shown at 24 and which projects upwardly through and beyond the top thereof, where it is screw-threaded for connection to a pipe 25. The shank 23 has an axial passage 26 which joins one or more radial passages 27 providing communication between the passage 26 and the upper end of the recess 21.

In order to form liquid supplied to the recess 21 into the desired annular film, the device of Figs. 1 and 2 embodies a control or regulating member in the form of a plug 30 having a circular head 31 coaxial with the recess 21 and of slightly smaller diameter than such recess to provide an annular passage 32 through which liquid in the recess flows downwardly in the shape of the desired annular film. In addition to distributing the liquid in the form of an annular film, the plug-head 31 may be arranged to vary the thickness of the film. For that purpose, the lower end of the recess 21 is given a slight outward taper and the plug 30 is mounted for axial adjustment relative to the body 20. To provide uniform thickness of the annular liquid film, the plug-head 31 should be maintained accurately concentric with the recess 21; and the plug is therefore provided with a pilot 33 slidably received in an axial cylindrical recess 34 in the stem 22. The axial position of the plug, and hence the effective cross-sectional area of the annular passage 32, may be controlled through a rod 35 which is secured at its upper end to the stem 22 and which extends downwardly through the stem. The stem is screw-threadedly mounted on the rod, as shown at 36; and below the stem the threaded rod-end is provided with a lock nut 37 to secure the plug in any desired position of axial adjustment.

If the leading edge of the annular film discharged through the annular passage 32 in the device of Fig. 1 is made one terminal of an electrostatic field of suitable strength, such leading film-edge will be drawn into a series of spaced, sharply pointed cusps 40 (see Fig. 14) from the tips of which liquid will be electrostatically atomized. The liquid particles leaving each cusp-tip will form a divergent jet 41, and the aggregate of all such jets will form a hollow frusto-conical spray. If the field strength and film-thickness are uniform over the extent of the leading edge of the annular film, the cusps 40 will be uniformly spaced about the circumference of such film, probably due to mutual forces of repulsion created by the field. If the opposite terminal of the field is an extended flat sheet normal to the axis of the atomizer, the liquid atomized from the tips of the cusps 40 will be deposited on such sheet in an annular pattern, as indicated at 42 in Fig. 13. In that figure, the density of the stippling employed to illustrate the pattern indicates in a general way the density of the deposited liquid. By moving the sheet in its own plane, the deposited liquid can be made to form a band having a width equal to the outer diameter of the annular pattern.

In order to make the leading edge of the annular film one terminal of an electrostatic field the other terminal of which is an article to be coated, the body member 20 of the atomizing device may be made of metal or other conducting material and connected to one terminal of a high-voltage source 45, conveniently through the pipe 25 which is made of metal. If this arrangement of electrical connections is used, the opposite terminal of the high-voltage source 45 may be grounded; and if the atomizer is to be used for coating an article, such article is disposed opposite the atomizer and may be electrically grounded. As a result of the electrostatic field thereby created between the leading edge of the film at the lower end of the body-member 20 and the article to be coated, the liquid is atomized to form a spray as above described, and the particled liquid constituting the spray moves under the influence of the electrostatic forces of the field toward the article, becoming dispersed meanwhile, and is eventually deposited on the article.

For best results, an atomizing device, if made of conducting material, should be so formed and disposed as to promote concentration of field-strength in the vicinity of the leading edge of the liquid film and uniformity of field-strength along such leading edge. For that reason, the portion of the device nearest the leading film-edge should be closer to the article than is any other portion of the device. For the same reason, the film-supporting portion of the body 20 is desirably attenuated in character. In the device of Fig. 1, the desired attenuation is attained by tapering the outer surface of the body until it meets the wall of the recess 21 at a narrow edge 47. The lower end of the plug 30 is located above the edge 47 and is desirably provided with a central recess the wall of which meets the exterior surface of the plug-head 31 in a narrow edge 48. When a head so constructed is disposed in opposed spaced relation to an oppositely charged article, the lines of force of the field will be relatively concentrated at the edge 47 to produce a high field-strength at the points where atomization of the liquid occurs.

In the device of Fig. 1, the edge 47 is shown as a knife edge, but it is not essential that it be so. The extreme attenuation provided by a knife-like edge such as is shown in Fig. 1 promotes a high degree of atomization of the liquid; but for many purposes, the edge may be blunt, as indicated at 47' in Fig. 14 and satisfactory atomization will still be obtained.

In Fig. 2 I have illustrated means for controlling the supply of liquid to the atomizing device from a remote point. In that arrangement a pneumatic cylinder 50 is mounted on the upper end of the pipe 25, such cylinder containing a piston 51 connected to a valve member 52 which extends downwardly through the pipe 25 and co-operates with a valve seat 53 (Fig. 1) provided in the upper end of the shank 23. The pipe 25 has a lateral branch 54 adapted for connection to a liquid supply conduit 55. A compression spring 56 located within the cylinder 50 urges the piston 51 downwardly and the valve member 52 toward its seat 53; and the lower end of the cylinder communicates with a conduit 57 through which air or other fluid under pressure may be admitted to force the piston 51 upwardly and to open the valve. Upward movement of the piston, and hence the opening of the valve, may be limited by an adjustable stop screw 58 mounted in the upper head of the cylinder 50.

Figure 3:
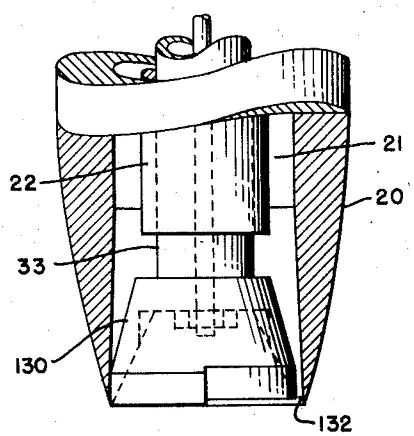
Fig. 3 is a fragmental side view, partially in section, showing a modification of the atomizer of Fig. 1.
Figure 4:
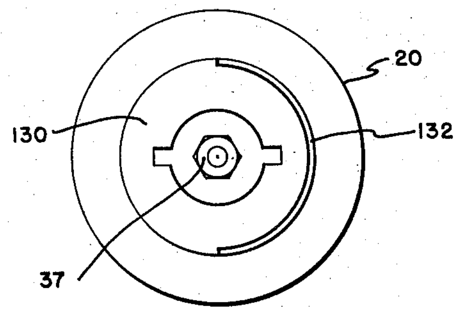
Fig. 4 is a bottom end view of the atomizer shown in Fig. 3.

The atomizing device illustrated in Figs. 3 and 4 is essentially the same as that shown in Fig. 1 except that it is adapted to produce a liquid film which is arcuate rather than completely annular in cross-section. To accomplish this result, the plug 30 of the device shown in Fig. 1 is replaced by a plug 130 having an external diameter equal to the diameter of the recess 21 in body member 20, such plug being relieved over a portion of its periphery to provide a passage 132 of arcuate form in cross-section and, as shown, of approximately 180° in circumferential extent. The liquid film will have substantially the same shape at its leading edge, and the pattern produced on an extended flat surface will be generally semi-circular.

Figure 5:
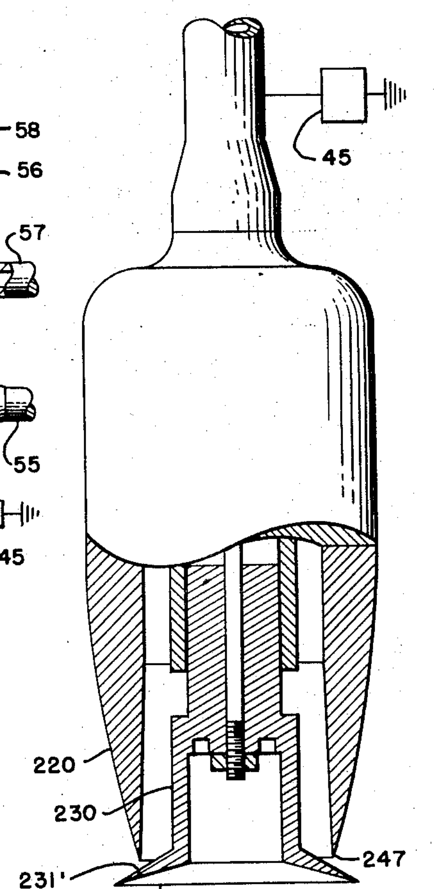
Fig. 5 is a side elevation partly in section of another form of atomizer embodying the invention.

The atomizer shown in Fig. 5 resembles that shown in Fig. 1 in that the liquid film is annular but differs from the atomizer of Fig. 1 in that the film is more conical than cylindrical in form. In this construction, insofar as formation of the film is concerned, the functions of the atomizer-body 220 and of the plug 230 are reversed, the film being supported on the upper, outwardly and downwardly sloping annular surface of a flange 231 provided at the lower end of the plug 230. The flange 231 extends outwardly beyond the lower edge 247 of the body 220, such edge serving as the control or regulating member which determines the thickness of the film. The plug 230 can be adjusted axially of the body 220 to vary the spacing between the upper surface 231' of the flange 231 and the lower edge 247 of the body and hence to vary the thickness of the film.

When positioned opposite and in spaced relation to an extended flat plate normal to its axis, the atomizer of Fig. 5 produces an annular pattern generally similar to that shown in Fig. 13, although for a given diameter of atomizer, both the inner and outer diameters of such pattern will be larger than those of the pattern produced by the atomizer of Fig. 1. The atomizer of Fig. 5 is especially adapted for the application of liquid coating material to recess walls or to the inner surfaces of hollow articles, as will be more fully brought out hereinafter.

It will be noted that in the atomizer shown in Fig. 5 the liquid forming the film, after passing through the control opening defined by the lower edge 247 of the body 220, spreads, or flows with a substantial radial component of velocity. As the film spreads in such manner it becomes thinner and has at its periphery a thickness considerably less than the width of the control opening defined by the lower edge of the body 220. Control of a radially spreading film at a point spaced inwardly from its periphery is of advantage in that the width of the control opening can be considerably greater than the thickness of the film at the edge from which atomization occurs, and the wider control opening thus permitted is easier to adjust and less liable to become occluded.

If the flange 231 is of conducting material and if the atomizer is used in the electrostatic coating of an oppositely charged article disposed opposite its end, the exposed film on the upper surfaces of the flange will be electrically shielded to a great extent, although not completely. As the extreme peripheral edge of the film will be exposed to the field, such shielding as exists is not detrimental, and in some instances, may be an advantage.

The atomizer illustrated in Figs. 6 and 7 differs from any so far described in that the liquid film is plane and atomization occurs from points disposed in a straight line. Such atomizer has the general form of a hollow triangular prism and comprises a horizontal top wall 310, downwardly converging side walls 311 and 312, and end walls 313 which cooperate to define an elongated chamber 314 of triangular cross-section. The side walls 311 and 312 are provided at their lower ends respectively with opposed parallel faces 315 and 316 spaced apart to define a narrow, elongated passage 317 through which liquid in the chamber 314 may escape to form the film from whose lower edge atomization is to take place. The thickness of such film may be controlled by the width of the passage 317 or, if desired, one of the side walls of the atomizer may be provided with an adjustable control member for that purpose. In the particular arrangement illustrated, the wall 311 extends downwardly below the lower edge of the wall 312, and an adjustable control member in the form of a plate 318 is adjustably secured on the wall 312. The plate 318 has a control face 319 disposed in opposed relation to the face 315 of the side wall 311. By movement of the plate 318 obliquely upward or downward along the side wall 312, the distance between the opposed faces 315 and 319 can be varied to vary the thickness of the liquid film. To adjust the plate 318, it may be provided at intervals along its length with slots 320 each of which receives an eccentric collar 321 secured to the side wall 312 by a screw 322. By loosening the screws 322 and rotatably adjusting the collars 321, the plate 318 may be adjusted to move its control face 319 either toward or away from the opposed face 315 of the side wall 311, and when the desired adjustment has been completed the screws 322 may be tightened. If desired, the face 315 of the side wall 311 may be provided with a longitudinally extending series of spaced grooves 323 to aid in the feeding of liquid from the chamber 314. Such grooves, if present, may extend downwardly below the lower edge of the side wall 312, but desirably terminate above the lower edge of the control member 318.

The atomizer shown in Figs. 6 and 7 may be supplied with liquid through a pipe 325 screw-threadedly connected with the top wall 310, the liquid entering the chamber 314 through an opening 326. The upper end of the opening 326 may constitute a valve seat with which there cooperates an axially movable valve member 327 extending upwardly through the pipe 325.

It will be noted from Figs. 6 and 7 that the lower edge 330 of the surface 315 is located below the lower edge of the control member 318. If the atomizer, and particularly the wall 311, is raised to a suitable potential, liquid escaping from the chamber 314 through the passage 317 forms on the lower portion of the surface 315 a free-surfaced film from the lower edge of which atomization takes place in the manner previously described. The thickness of such film is controlled by adjustment of the control member 318. It is not essential that the edge 330 of the side wall 311 be located below the lower edge of the control member 319; for, if desired, the control face of the member 318 may extend downwardly below the edge 330, in which event the free-surfaced film would be supported on the face 319 and atomization from the film would occur adjacent the lower edge of such face. In fact, it is not essential that the lower edge of one of the faces defining the terminal portion of the liquid passage be located beyond the other; but that feature, like the knife-edge 330 shown, contributes to a concentration of field strength and hence promotes fineness of atomization. If maximum fineness of atomization is deemed unnecessary or undesirable, the terminal edges of the two passage-defining faces might be located at the same level, or if one edge is located beyond the other it might be rounded, like the edge 47′ in Fig. 14.

In using the atomizer of Figs 6 and 7 in electrostatic coating, it is desirably positioned opposite an article to be coated and so disposed, if possible, that the edge 330 is generally parallel to the article-surface; and the article is then so moved as to cause its surface to travel in a direction transverse to the edge 330. With an electrostatic field maintained between the lower edge of the liquid film and the article, such film-edge will be drawn into a series of cusps from the tips of which atomization will occur. The atomized material will leave each cusp tip in the form of a divergent jet, and the aggregate of all the jets from the cusp-tips will form a generally prismatic spray. If the article being coated is an extended flat sheet, such spray will produce a substantially rectangular pattern having rounded ends. It is not essential for the edge 330 to be horizontal or for the liquid film to be vertical, although it is desirable that the atomizer, if of conducting material, be so disposed as to avoid electrical shielding of the film-edge from which atomization is to take place.

Fig. 8 illustrates an atomizer which, like those of Figs. 1 and 5, produces an annular spray-pattern. It comprises a funnel-like or cone-shaped reservoir 410 whose annular wall is shown as decreasing in thickness toward an annular, narrow edge 411. At its apex, the conical reservoir is provided with an inlet opening 414 controlled by a valve 415.

The atomizer of Fig. 8 is especially suited for the coating of the bottom surfaces of sheets or other articles. In such use, it is disposed as shown with its edge 411 presented upwardly in opposed, spaced relation to the surface to be coated, which may be the lower surface of a horizontally moving sheet 416. Liquid coating material admitted to the reservoir through the opening 414 fills the conical recess, forming a concave meniscus which extends a short distance upwardly along the reservoir-wall to a point above the liquid level. Such meniscus constitutes, in effect, an annular film; and if the liquid level within the reservoir is so maintained as to keep such film at the edge 411 while a high difference of electrical potential is maintained between the film and the sheet 416, atomization from the film-edge will occur in much the same fashion as in the atomizer of Fig. 1.

Fig. 9 shows a coating apparatus which utilizes an atomizer such as that shown in Figs. 1 and 2, and which is adapted to coat the exteriors of cylindrical objects, such as metal canisters 508 and covers 509 therefor. This coating apparatus comprises an atomizer 510, supported in any suitable manner in the vertical position indicated and electrically connected to a voltage source 511. Spaced below the head 510 is a conveyor generally shown at 515, which includes a plurality of supports 516. Each support 516 is provided with a pair of spindles 517, each of which has mounted thereon a pulley 518. Each spindle 517 is adapted to support one of the articles to be coated. Rotating mechanisms, shown as belts 520, are provided on each side of the conveyor 515 for rotating the pulleys 518 and thereby the articles 508—509 in the direction indicated by the arrows.

In operation the conveyor 515 moves in the direction indicated by the arrow, to carry the articles 508—509 in two rows past the atomizer 510, which is disposed above and between such rows. The articles, which are conveniently grounded through the conveyor, approach and move past the head 510, which is maintained at elevated potential by virtue of its connection to the source 511. Coating material fed to the atomizer is atomized as above set forth to form a generally downwardly directed spray, and the particles forming such spray are electrostatically attracted to and deposited on the articles. The combined rotative and translational motion of the articles results in a satisfactorily uniform distribution of the coating material on their side and upper surfaces.

Figure 10:
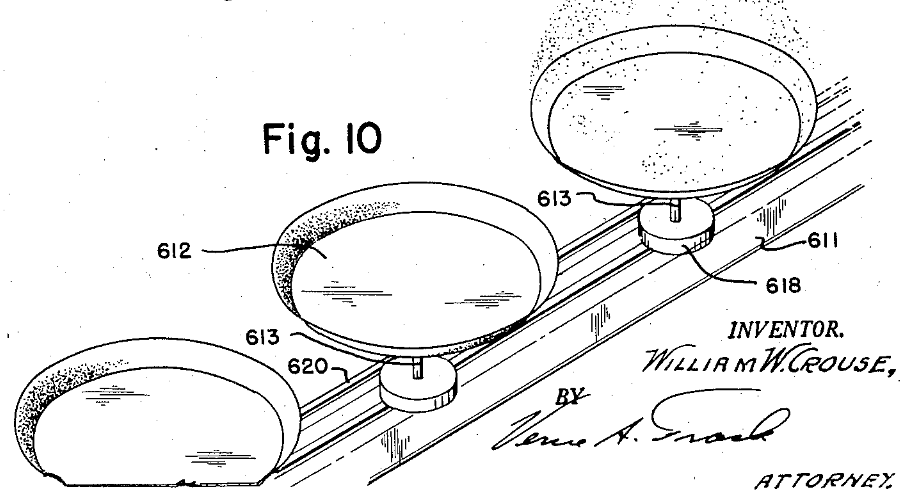
Fig. 10 is an isometric view of another form of coating apparatus incorporating the atomizer shown in Figs. 1 and 2.

Fig. 10 shows another coating apparatus embodying an atomizer of the type shown in Fig. 1. In such apparatus, the atomizer 610 is so arranged with respect to a conveyor 611 that the articles to be coated, shown as circular trays 612, pass in a single column directly beneath it. The articles are carried on spindles 613 forming part of the conveyor; and such spindles may be rotated, as by mechanism 618—620 similar to that of Fig. 9, if such rotation is necessary to satisfactory uniformity of coating.

Figure 11:
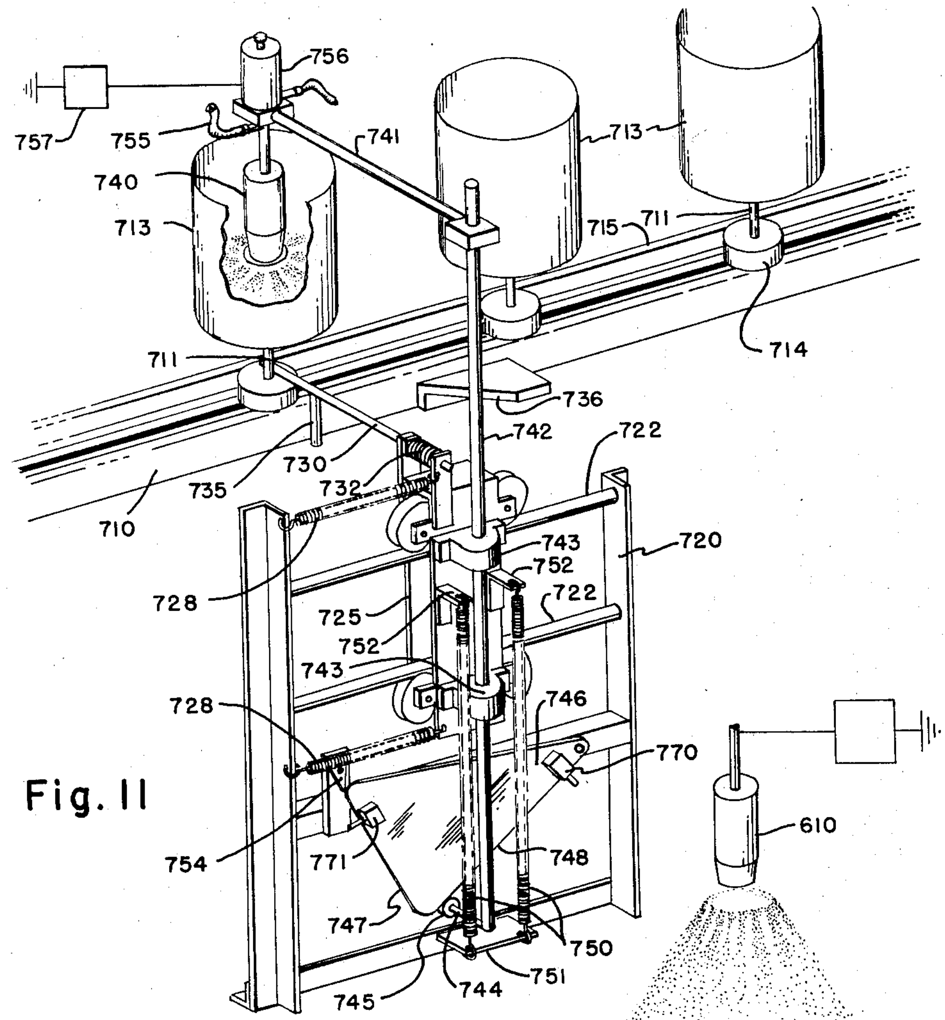
Fig. 11 is a perspective view of coating apparatus suitable for use in coating interior surfaces.

Fig. 11 shows a coating apparatus for coating the interior surfaces of articles which utilizes a head like the one illustrated in Fig. 5. This apparatus comprises a conveyor 710 which includes article supports 711 adapted to support articles such as the open-topped canisters 713. If desired, the supports 711 may be rotatable and provided with pulleys 714 engaged by a belt 715 to rotate the articles as they are being coated.

A frame structure 720 located at one side of the conveyor embodies rods 722 which extend parallel to the conveyor and provide a guiding support for a horizontally reciprocable carriage 725. Such carriage is urged along the rails 722 rearwardly, or in a direction counter to the direction of conveyor movement, by tension springs 728 and is arranged to be moved with the carriage in a forward direction by a rod 730 which is adapted to project from the carriage into the path of the supports 711. The rod 730 is mounted in the carriage for reciprocation longitudinally of itself and transversely of the direction of conveyor movement. A spring 732 urges the rod outwardly of the carriage toward a position in which it crosses the path of the supports 711. The rod is provided with an abutment 735 which, as the carriage nears the end of its movement with the conveyor, engages a stationary cam 736 at the side of the conveyor and is urged thereby inwardly of the carriage to free the end of the rod from engagement with the article-support 711. When this occurs, the carriage is returned to its starting point by the springs 728, and the spring 732 projects the rod into position for engagement by the next article support 711.

The atomizer 740, similar to that of Fig. 5, is supported through an insulating bracket 741 from the upper end of a rod 742 which is vertically reciprocable in guides 743 carried by the carriage 725. At its lower end, the rod 742 has rigid with it a spindle 744 which rotatably supports a cam follower 745 adapted to co-operate with a cam plate 746 stationarily secured to the frame 720. The cam plate 746 has two downwardly presented follower-engaged cam surfaces 747 and 748, the former sloping downwardly and the latter upwardly with respect to the direction of conveyor movement. Tension springs 750, acting between a plate 751 on the lower end of the rod 742 and brackets 752 on the carriage 725, urge the rod upwardly.

As the carriage 725 reciprocates, the cam follower travels around the cam plate in a counterclockwise direction. During forward, or rightward, movement of the carriage the springs 750 hold the cam follower 745 against the cam surfaces 747 and 748, as a result of which the rod 742 is moved first downwardly and then upwardly. During rearward movement of the carriage, the cam follower 745 passes above the plate 746, the rod 742 being held in an upper position determined by engagement of the plate 751 with the lower rod-guide 743. As the carriage nears the rearward limit of its movement the follower 745 displaces and passes beneath a pivoted pawl 754 which returns to the position indicated in Fig. 11 after the follower 745 has cleared it. On the ensuing forward movement of the carriage, the cam follower engages the pawl, which provides, in effect, an upward continuation of the cam-surface 747 and hence serves to start the cam follower and the rod 742 on their downward movement.

The atomizer 740 is supplied with coating material through a flexible hose 755 under the control of a suitable valve (not shown) which may be similar to the valve 52 illustrated in Fig. 1. If such a valve is employed, it may be operated under remote control through the medium of a fluid-pressure motor 756 similar to that shown in Fig. 2. To provide the elevated electrical potential necessary to electrostatic atomization, the atomizer 740 may be made of conducting material and connected to the ungrounded terminal of a high-voltage source 757.

The insulating bracket 741 is so disposed relative to the rod 730 that when the latter is in engagement with an article-support 711 the atomizer 740 will be substantially coaxial with an article on such support. The bracket 741 is so disposed on the rod 742 that when the rod is in its upper position the atomizer will be positioned high enough to clear an advancing article 713. When in the movement of the conveyor such article comes directly beneath the atomizer, the support carrying it engages the rod 730 thus causing the carriage, as well as the atomizer 740 which is supported therefrom, to move with the conveyor and maintain the axial alignment of the atomizer and the article. As the carriage moves forwardly, the cam plate 746 first causes the atomizer to be lowered into the interior of the article 713 and then to be raised to its uppermost position above such article. As the upper position of the atomizer is attained, the abutment 735 on the rod 730 engages the cam 736, which acts to retract the rod until its end clears the support 711, whereupon the springs 728 retract the carriage to its starting point and the spring 732 advances the rod 730 for engagement by the next article-support. The supply of fluid to the atomizer and the potential of the atomizer are desirably automatically controlled, by mechanism hereinafter described, to cause the electrostatic atomization of coating material while the atomizer is within each article 713 but to shut off the supply of coating material and free the atomizer of its high potential when the atomizer is in its upper position.

To effect the automatic control just mentioned, the apparatus illustrated in Fig. 12 may be employed. As there shown, the voltage-source 747 comprises a step-up transformer 760 the secondary terminals of which are connected respectively to ground and to the filament-cathode of a thermionic rectifier 761 the anode of which is connected through a conductor 762 to the atomizer 740. Filament current for the rectifier 761 is provided by a step-down transformer 763 the primary of which, while the coating apparatus is in operation, is permanently connected to an alternating-current supply line 764. The primary of the transformer 760 is connected to the supply line 764 through switch contacts 765 of an electromagnetic switch embodying a winding 766. The electromagnetic switch embodies a second set of contacts 767 which control the supply of current from the supply line 764 to a solenoid 768 operating a fluid-pressure valve 769 which, in turn, controls the fluid-pressure motor 756 operating the coating-material valve associated with the atomizer 740. The winding 766 of the electromagnetic switch is connected to the supply line 764 through a normally closed switch 770 and a normally open switch 771, the latter being bridged by a holding circuit 772 including a third set of contacts 773 of the electromagnetic switch. All contacts of the electromagnetic switch are biased toward open positions, and are adapted to be closed when the winding 766 is energized. The switches 771 and 770 (see Fig. 11) are of the mechanically actuatable type, are disposed adjacent the respective upper ends of the cam surfaces 747 and 748 of the cam plate 746, and have actuating members which project into the path of the cam-follower spindle 744 so that such spindle, as it passes each switch, will momentarily reverse its normal condition.

The apparatus as illustrated in Fig. 11 and Fig. 12 in the condition existing when the atomizer is at an intermediate point in its vertical travel within an article 713. In this condition, current from the supply line 764 is being supplied to the winding 766 of the electromagnetic switch through the closed switch 770, the contacts 773 of the electromagnetic switch, and the holding circuit 772. As a result of the energization of the winding 766, the contacts 767 are closed to energize the solenoid 768 and the contacts 765 are closed to energize the high-voltage transformer 760. Energization of the solenoid 768 operates the valve 769 to admit fluid under pressure to the motor 756, thus opening the valve which controls the supply of coating material to the atomizer 740. The closed condition of the contacts 765 results in the supply of current to the transformer 760 and in the imposition of its rectified output upon the body of the atomizer 740. On consequence of these conditions, the coating material is being supplied to the atomizer to be electrostatically atomized therefrom and electrostatically deposited over the inner surface of the article 713 within which the atomizer is disposed.

As the carriage 725 continues its forward movement, the cam follower moves upwardly along the cam surface 748, and its spindle 744 eventually engages the operating element of the switch 770 to open such switch momentarily. When this event occurs, the supply of current to the winding 766 is interrupted, such winding is deenergized, and the contacts 765, 767, and 773 all opened to deenergize the transformer 760, to deenergize the solenoid 768, and to open the holding circuit 772. Deenergization of the transformer 760 interrupts the supply of high potential to the atomizer 740, while deenergization of the solenoid 768 operates the valve 769 to cause the fluid-pressure motor 756 to shut off the supply of coating material to the atomizer. As a result, electrostatic atomization ceases. Following retraction of the rod 730 by the cam 736, the carriage 725 returns to its rearmost position under the influence of the springs 728 as above described. When the next article support 711 engages the rod 730, the carriage begins another forward movement, the cam follower 745 first engages the pawl 754 and then the cam surface 747 to lower the atomizer 740 into the interior of the article on such next support 711. As the atomizer enters the interior of such article, the spindle 744 engages and momentarily closes the switch 771 to complete the circuit from the supply line 764 through the winding 766. The resultant energization of such winding closes the contacts 765, 767, and 773 to energize the high-voltage transformer 760, to energize the solenoid 768, and to complete the holding circuit 772 through which the winding 766 is kept energized when the switch 771 opens as the spindle 744 moves out of association with it. The energization of the transformer 760 and of the solenoid 768 institutes electrostatic atomization and precipitation which continue until the cam follower 745 opens the switch 770 in upward movement of the rod 742 and atomizer 740, as above set forth.

By an obvious relocation of the switches 770 and 771, the apparatus of Figs. 11 and 12 could be arranged to cause the atomizer 740 to discharge either on its down-stroke only or on its up-stroke only. It is not essential that the application of high potential to the atomizer begin and terminate sumultansously with the opening and closing of the valve which controls the supply of coating material to the atomizer.

In all the various different forms of atomizers described above, the liquid to be atomized flows in the form of a film to the site of atomization, where an electrostatic field is maintained over the leading edge of the film. The film is relatively thin, having a thickness which is but a small fraction of its extent in the other direction transverse to its direction of flow. As above noted, the field draws the leading film-edge into a series of cusps from the tips of which atomization takes place, the atomized particles leaving each cusp-tip in the form of a divergent jet and the aggregate of such jets constituting the spray. The spacing of the cusps depends to a large extent upon field strength; and in coating operations, the field strength will depend upon the distance and potential difference maintained between the leading edge of the film and the article being coated. In general, the spacing of the cusps will decrease as the field-strength increases; and it is therefore possible in most instances to so space the cusps that, at the article-surface, the individual divergent jets will approach each other so closely as to prevent the existence of any substantial voids or discontinuities in the deposited pattern. It has been found, however, that if the distance between the atomizer and the article is decreased, difficulty is experienced in preventing discontinuities in the deposited pattern of coating material. As the distance between the atomizer and the article decreases, less and less distance remains between the cusp-tips and the article surface, and eventually a condition is reached in which such distance becomes so small that the particles leaving each cusp-tip become deposited before they have an opportunity to disperse to the extent necessary to form a pattern substantially continuous with the pattern formed by particles from adjacent cusp-tips. If the gap is not too narrow such condition can frequently be remedied by increasing the applied voltage to decrease cusp-spacing; but at narrower gaps, the break-down voltage may be obtained before discontinuities in the pattern are eliminated, Sometimes, at narrow gaps, the cusp-tips will bridge the gap and touch the article, and no dispersion at all will occur. In general, it is impractical to attempt the production of a continuous coating at gaps much less than one quarter-inch in width. My invention contemplates that the gap between the atomizer and article will be great enough to insure the dispersion necessary to production of a continuous coating. In no case will the gap be narrow enough to permit coating material supported on the atomizer to bridge the gap to the article; and in the preferred mode of practicing the invention, the cusp-tips will be materially farther from the article than they are from the nearest point on the film-supportinug surface of the atomizer. Also, the spacing between adjacent cusp-tips will be less than their distance from the article. In practice, it has been found convenient in many instances to maintain a distance on the order of ten inches between article and atomizer, at which distance a potential difference of 100,000 volts will effect satisfactory atomization, dispersion, and precipitation.

As a specific application of my invention, I cite the coating of covered metal canisters with apparatus like that shown in Fig. 9 embodying an atomizer of the type shown in Figs. 1 and 2. In that application, the following conditions obtained:

| | |
|---|---|
| Potential of discharge edge 47 | 100,000 volts negative). |
| Potential of article being coated | Ground potential. |
| Spacing between atomizer and the closest surface of canisters | 8 inches–10 inches. |
| Longitudinal spacing of rotating spindles 517 | 18 inches. |
| Transverse spacing of spindles 517 | 12 inches. |
| Diameter of canisters | 3 inches–7 inches. |
| Height of canisters | 6 inches–10 inches. |
| Width of passage 32 | .002 to .005 inch. |
| Diameter of discharge edge 47 | 1.5 inches. |
| Form of discharge edge 47 | Knife edge between two smoothly ground surfaces whose included angle is 15°. |
| Liquid coating material | Synthetic enamel, modified urea formaldehyde, 20 sec. viscosity on Zahn #2 cup at 75° F. |

Under the conditions above set forth, the spacing of the cusps of coating material which formed on the discharge edge was of the order of fifty to the inch. Cusp form and spacing depend upon the viscosity and conductivity of the liquid, and upon the rate of liquid supply, as well as upon field strength. Liquids with high insulating properties, such as transformer oil, do not form well-defined cusps. Viscous liquids tend to form greatly elongated cusps which tend to break up into filament-like segments rather than into fine drops.

The voltage-source used in the above example provided half-wave rectification with some inherent filtering; but satisfactory coatings can be obtained with unrectified A.C. In general, steadiness of the potential applied to the head promotes fineness of atomization and decreases scattering of the atomized particles. The effectiveness of the electrostatic field in causing atomization and deposition of atomized material will vary in the same sense as the applied voltage, and it is therefore desirable in most instances to use the highest voltage consistent with freedom from possible sparking. Voltages which create between the atomizer and article an average potential gradient of 8,000 to 12,000 volts per inch are very satisfactory.

The invention can be practiced without regard to the polarity of the potential maintained on the leading edge of the liquid film. In coating apparatus using a ground return, either the atomizer or the article can be connected to the voltage-source through ground; but in most instances it will be more convenient to ground the article. In order to maintain an effective field, the charges carried by the deposited particles must escape through the article. Most materials, including many usually thought of as insulators, are sufficiently conductive to permit the escape of charges even over paths of considerable length but in coating an article made of one of the more effective insulating materials, it may be desirable to use a backing electrode or some other expedient to shorten the escape-path.

It is not essential that the atomizer, or even that portion of it which supports the film, be made of conducting material. Most liquids, and especially most coating materials, are sufficiently conducting that if the atomizer is made of insulating material the potential can be applied to the film-edge through the film itself. Moreover, the current consumed in the atomizing operation is so small that it can be conducted to the discharge edge of the atomizer through materials of relatively high insulating properties.

I have referred above to the fact that fine atomization is promoted by the employment in the atomizer of sharp-edged film-supporting elements. Where fine atomization is of no moment, or undesired, the shape of the film-supporting element in cross-section transverse to its extent is of little consequence. If the atomizer of Fig. 1 is modified by rounding the edge 47 on a radius of 0.005 inch, no significant change in the fineness of atomization results. An edge rounded on a small radius has an advantage in reducing danger of injury to personnel and also in reducing danger of injury to the edge itself. Discontinuity of the edge, such as would result from a nick therein, might interfere with the uniform distribution of liquid therealong. Where deposition of an extended film of coating material free from discontinuities is desired, the edge itself should be free from abrupt discontinuities; although discontinuities or irregularities whose dimensions are smaller than the spacing of the cusps are not objectionable.

In addition to the cross-sectional shape of the film-supporting element of the atomizer the applied voltage and the rate of liquid flow influence the fineness of atomization. Increasing the applied voltage tends to increase the fineness of atomization, while an increase in the rate of fluid supply tends to decrease it. Obviously, the liquid should not flow to the film-edge at a rate greater than that at which the field will atomize it. The amount of liquid which can be atomized with any desired degree of fineness from an atomizer will of course depend upon the total length of the film-supporting element of the atomizer.

It will be understood of course that the stippled showing in Fig. 13 represents the pattern created in a brief interval of time. The disposition of deposited particles is largely haphazard within the borders of the pattern; and as the spraying is continued, the individually deposited particles of liquid coating material flow together to form a coating which, except at its edges, is entirely continuous. By producing relative movement of the spray and the article in a direction generally transverse to the lines of force of the field, a continuous coating over the entire surface of the article may be produced.

It will also be understood that the pattern shown in Fig. 13 is that created on a substantially flat surface of considerable extent relative to the distance between the atomizer and the surface. The shape of the field—that is, the dimensional pattern represented by all the lines of force—will depend upon the shape of the article. The divergence of the liquid spray will generally decrease as the article is approached, and in many instances the spray will actually be convergent at the article-surface.

Any of the atomizers can be used otherwise than in the application of liquid coatings. In such case, the atomizers may be supported spaced from grounded objects and connected to one terminal of a high-voltage source the other terminal of which is grounded. In such use, the potential applied should be at least 10,000 volts, and it is unnecessary to provide any electrode in spaced relation to the atomizer and of opposite polarity thereto. By providing such an opposed electrode, however, and raising it to a sufficient potential, atomization can be effected even with the atomizer grounded. In the latter case, the opposed electrode will be spaced from the cusp-tips far enough to permit the particles atomized from such cusp-tips to disperse.

In coating apparatus, it is desirable to arrange the atomizer so that the spacing between the leading edge of the film and the article surface will be as uniform as possible throughout the extent of such film-edge, as such an arrangement promotes uniformity of field-strength and of atomization along the film edge. In the coating of contoured surfaces, it is frequently of advantage to employ an atomizer embodying a film-supporting member having an edge shaped to be spaced uniformly from such surface. It is for this reason that the atomizer of Fig. 5 is especially suited for coating concave cylindrical surfaces, as in Fig. 11; for the distance between the edge of the film-supporting flange 231 and the inner surface of the canister 713 may be made uniform throughout the circumference of the edge of such flange. Atomizers like that of Fig. 1, when used as in Figs. 9 and 10 to coat articles moving successively past them, are desirably oriented so that the plane of the cusp-tips is substantially parallel to the path of article movement.

The specific embodiments of my invention illustrated and described herein are set forth merely as examples of a few of the many ways in which the invention can be practiced, and it is therefore to be understood that the scope of my invention is not to be limited by those examples but instead is to be determined from the appended claims.

I claim as my invention:

1. A method of electrostatically distributing liquids as a coating on an article, comprising the steps of flowing a stream of liquid coating material from a supply source including an orifice and positively deforming it into a thin annular flowing film, advanced without subdivision along a supporting surface to an atomizing zone to provide a thin circular film edge substantially spaced from the article and having an extent many times its thickness and many times the minimum dimension of said orifice, the material being uniformly distributed along the entire extent of said edge and projecting beyond said supporting surface, creating between the article and the leading edge of such film an electrical potential creating an electrostatic field of sufficient strength to form such leading edge into a series of spaced cusps, to affect the spacing of said cusps and to electrostatically atomize, disperse and deposit on said article while still in liquid state finely divided particles of liquid from the tips of such cusps, the cusps being so closely spaced as to provide a substantially continuous atomizing zone and the distance between the article and the atomizing zone being great enough to permit substantial dispersion of the liquid spray particles as they proceed toward the article, the atmosphere at the article and between it and the atomizing zone being quiescent whereby electrostatic forces will effect deposition on the article of a substantial number of particles which otherwise would not have been deposited thereon, and supplying additional coating material to said film in rear of its leading edge to maintain the flow of the film to such leading edge.

2. A method of electrostatically distributing liquid as a coating on an article, comprising the steps of flowing a stream of liquid coating material from a supply orifice and positively deforming it into a thin film advanced without subdivision from the orifice to an atomizing zone to provide a thin film edge substantially spaced from the article and having an extent many times its thickness, creating between said film edge and said article an electrostatic field of sufficient strength to form and affect the spacing of cusps at said edge and to electrostatically atomize finely divided discrete particles of liquid as a spray from the edge of said film at said zone, supplying said film with liquid at a controlled rate to replace that so atomized, and electrostatically dispersing said particles and depositing them still as discrete liquid spray particles on the article, the distance between the article and the atomizing zone being great enough to permit substantial dispersion of the liquid spray particles as they proceed toward the article, the atmosphere at the article being quiescent whereby electrostatic forces will effect deposition on the article of a substantial number of particles which otherwise would not have been deposited thereon.

3. In a method of electrostatically spray coating the surface of an article with liquid atomized from an extended atomizing zone, the steps of flowing liquid coating material at a controlled rate from a source of supply, forming it into a thin supported film, advancing said supported film toward said atomizing zone, said film having a uniform edge extending along said atomizing zone for a distance many times its thickness, establishing between said film-edge and said article an electrostatic field of sufficient strength to form said film-edge into a series of spaced cusps and to electrostatically atomize finely divided discrete particles of liquid as a spray from said cusps, said film edge being sufficiently uniform to permit said field to determine the spacing of said cusps, and electrostatically dispersing and depositing said particles on the article surface while still in liquid state, said article surface being in a substantially quiescent atmosphere and at a distance from said atomizing zone sufficient to permit substantial dispersion of the liquid spray particles as they proceed toward the article.

4. The method of claim 3, further characterized in that said film-edge is substantially rectilinear.

5. The method of claim 3, further characterized in that the film-edge is a circle.

6. The method of claim 3, further characterized in that the film-edge is generally arcuate.

7. The method of claim 3, further characterized in that the atomizing zone is annular and the article to be coated moves along a predetermined path intersecting the projected axis of the atomizing zone whereby the atomized particles will move generally axially of said zone as they proceed toward the article surface.

8. The method of claim 3, further characterized in that said film-edge is arcuate and the article surface to be coated is spaced outwardly from the film-edge in the plane thereof whereby the atomized particles will move generally in such plane as they proceed toward the article surface.

9. Apparatus for electrostatically spray coating the surface of an article with liquid atomized from an extended atomizing zone, comprising an atomizing head, means for delivering liquid coating material at a controlled rate from a source of supply to said head, said head including means for forming said liquid into a thin supported film and for providing said film with a substantially uniform leading edge extending along the atomizing zone, means for establishing between said film-edge and said article an electrostatic field of sufficient strength to draw the liquid of the film-edge beyond its support and form said film-edge into a series of spaced cusps, to electrostatically atomize said liquid from said cusps into a spray of finely divided discrete particles, and to disperse and deposit said particles on the article surface while still in liquid state, and means for positioning the article surface at a distance from the atomizing zone to permit substantial dispersion of liquid spray particles through a quiescent atmosphere as they proceed toward the article surface.

10. Apparatus of the character claimed in claim 9, further characterized in that said film-forming means includes a surface provided on said head and having a margin extending along said atomizing zone, said means for delivering liquid coating material discharging such material onto said surface in rear of said margin for flow over said surface as a free-surfaced film to the atomizing zone.

11. Apparatus for electrostatically spray-coating an article by depositing thereon discrete spray particles, comprising a support for the article, an applicator head providing an extended atomizing zone spaced from the article on said support, passage means for delivering liquid coating material to said head at a positively regulated rate, said head having an elongated orifice communicating with said passage means and provided by opposed closely spaced flow-controlling confronting surface portions for forming said material into a thin film and for delivering the film to said atomizing zone, said article-support and head being so spaced that the shortest distance between the atomizing zone and the article on said support is many times greater than the diameter of a drop of the liquid coating material, means including a high voltage source for providing electrostatic charge differentials between the surface of the article and atomized particles of sufficient strength both to disperse the charged spray particles into a condition of substantially uniform distribution relative to the extended atomizing zone and to draw the charged spray particles rapidly through quiescent air generally along the lines of force of the field to an adjacent article surface, and means for moving said support and article past said head throughout a substantial distance during particle deposition in unvarying relationship to each other, the direction of movement of said support relative to said head being such as to effect a substantial displacement of the article surface transverse to the general direction of said lines of force during particle deposition to cause such lines of force to sweep such article surface, said atomizing zone having an extent many times the minimum dimension of said orifice.

12. Apparatus of the character claimed in claim 11, further characterized in that the confronting surface-portions have generally arcuate, closely spaced edges providing a generally arcuate atomizing zone of substantial extent.

References Cited in the file of this patent

UNITED STATES PATENTS

| | | |
|---|---|---|
| 1,149,810 | Crosbie | Aug. 10, 1915 |
| 1,832,096 | Chaffee | Nov. 17, 1931 |
| 1,861,475 | Hopkins | June 7, 1932 |
| 1,958,406 | Darrah | May 15, 1934 |
| 2,049,940 | Barthel | Aug. 4, 1936 |
| 2,187,306 | Formhals | Jan. 16, 1940 |
| 2,221,338 | Wintermute | Nov. 12, 1940 |
| 2,246,211 | Kilich | June 17, 1941 |
| 2,247,000 | Popoff | June 24, 1941 |
| 2,336,946 | Marden et al. | Dec. 14, 1943 |
| 2,438,561 | Kearsley | Mar. 30, 1948 |
| 2,451,288 | Huebner | Oct. 12, 1948 |
| 2,463,422 | Ransburg | Mar. 1, 1949 |
| 2,509,448 | Ransburg et al. | May 30, 1950 |
| 2,526,178 | Weber | Oct. 17, 1950 |

FOREIGN PATENTS

| | | |
|---|---|---|
| 591,474 | Great Britain | of 1947 |